D. G. TEMPLE.
Wood-Fences.
No. 136,679. Patented March 11, 1873.
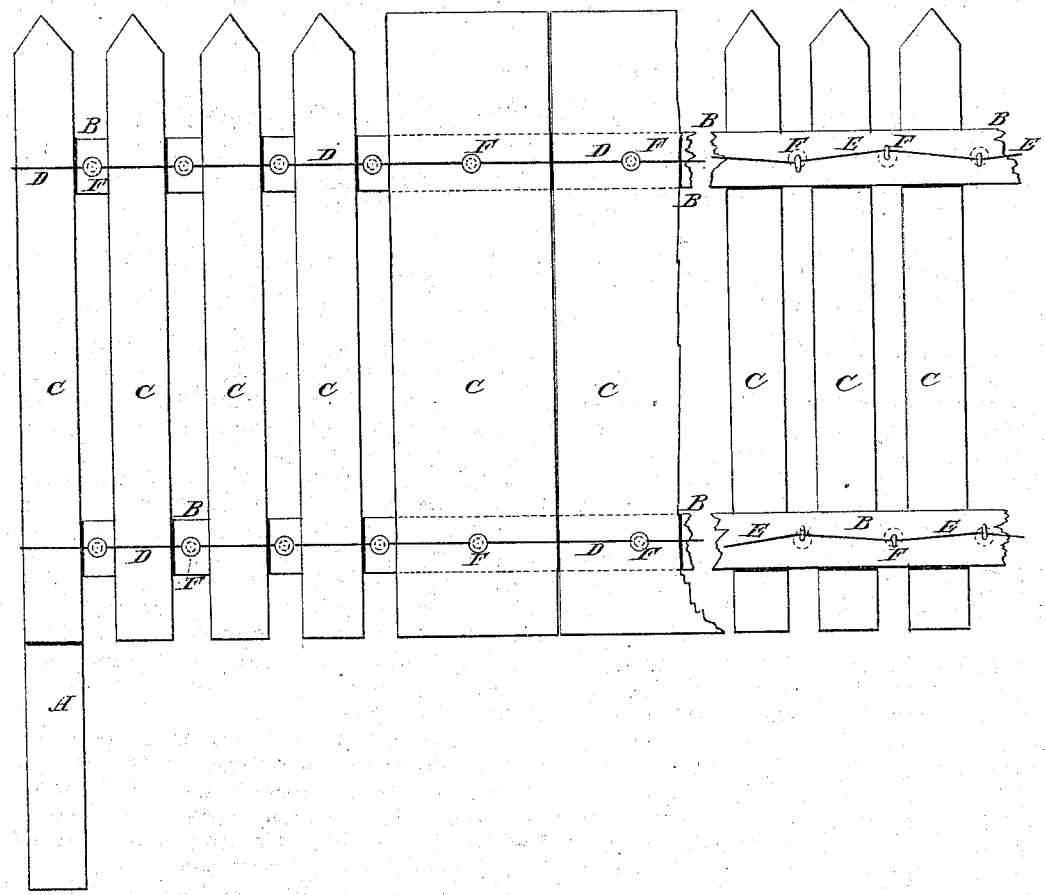

UNITED STATES PATENT OFFICE.

DANIEL G. TEMPLE, OF FARMERSVILLE, LOUISIANA.

IMPROVEMENT IN WOOD FENCES.

Specification forming part of Letters Patent No. 136,679, dated March 11, 1873.

*To all whom it may concern:*

Be it known that I, DANIEL G. TEMPLE, of Farmersville, in the parish of Union and State of Louisiana, have invented a new and useful Improvement in Picket and other Fences, of which the following is a specification:

Figure 1 is a side view of a portion of my improved fence. Fig. 2 is a view of the other side of a portion of the same. Fig. 3 is a top view of the same.

Similar letters of reference indicate corresponding parts.

My invention has for its object to furnish an improved fastening for securing pickets and other upright boards or planks to the horizontal bars of the fence, which shall be simple in construction, readily applied, and substantial and reliable in operation, holding the pickets, boards, or planks firmly and securely. The invention consists in the combination of the two wires and clinched bolts with the posts, horizontal bars, and pickets, boards, or planks, in the manner hereinafter fully described.

A represents the posts, which are set in the ground in the ordinary manner, and to which are attached the horizontal bars B, also in the ordinary manner. C represents the pickets or upright boards or planks, which are secured to the horizontal bars B by wires D E and bolts or spikes F.

In putting up the fence the bolts F are passed through the bars B midway between the pickets C. The wire D is passed through a hole in the head of the bolts or around a groove or neck formed upon said bolts. The wire E is passed along the bar B upon the side opposite the pickets, and the ends of the bolts or spikes F are bent down or clinched around the said wire E.

If desired, the end of the bolts F may be split to facilitate the clinching. By passing the wire E alternately above and below the ends of the bolts F, and clinching said ends alternately upward and downward, the wire E will take a slightly zigzag direction, and will thus be drawn taut, and will draw against the body of the bolts instead of against their turned-over points. The wires D E are secured to the posts A.

In case the boards or planks C are to be placed close together to form a close fence the bolts F are passed through the middle parts of said boards or planks, as shown in Figs. 1 and 3, and the wires D E are connected with them, as hereinbefore described.

Having thus described my invention, I claim as new and desire to secure by Letters Patent—

The combination of the two wires D E and the clinched bolts or spikes F with the posts A, horizontal bars B, and pickets, boards, or planks C, in substantially the manner herein shown and described.

DANIEL GOODUL TEMPLE.

Witnesses:
   H. H. HAM, Jr.,
   W. B. H. PON.